United States Patent
Sipple et al.

(10) Patent No.: US 11,459,831 B2
(45) Date of Patent: Oct. 4, 2022

(54) METHOD AND SYSTEM FOR ANCHORING DOWNHOLE COMMUNICATIONS PATHS

(71) Applicant: HALLIBURTON ENERGY SERVICES, INC., Houston, TX (US)

(72) Inventors: Michael Kevin Sipple, Duncan, OK (US); Shubhangi Bhimraj Dalavi, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 117 days.

(21) Appl. No.: 16/977,786

(22) PCT Filed: Apr. 4, 2018

(86) PCT No.: PCT/US2018/026113
§ 371 (c)(1),
(2) Date: Sep. 2, 2020

(87) PCT Pub. No.: WO2019/194802
PCT Pub. Date: Oct. 10, 2019

(65) Prior Publication Data
US 2020/0399963 A1 Dec. 24, 2020

(51) Int. Cl.
*F16G 11/04* (2006.01)
*E21B 17/02* (2006.01)
*E21B 47/135* (2012.01)
*E21B 17/00* (2006.01)
*H01B 7/20* (2006.01)
(Continued)

(52) U.S. Cl.
CPC .......... *E21B 17/026* (2013.01); *E21B 17/003* (2013.01); *E21B 47/135* (2020.05); *F16G 11/048* (2013.01); *H01B 7/20* (2013.01); *H01B 9/005* (2013.01); *H01B 11/22* (2013.01)

(58) Field of Classification Search
CPC combination set(s) only.
See application file for complete search history.

(56) References Cited

U.S. PATENT DOCUMENTS

| 4,896,939 A | 1/1990 | O'Brien |
| 5,193,614 A | 3/1993 | Cox |

(Continued)

FOREIGN PATENT DOCUMENTS

GB 1280439 A 7/1972

OTHER PUBLICATIONS

International Search Report and Written Opinion; PCT Application No. PCT/US2018/026113; dated Jan. 2, 2019.

*Primary Examiner* — Chad H Smith
(74) *Attorney, Agent, or Firm* — Polsinelli PC

(57) ABSTRACT

An anchoring assembly for securing a cable having both an optical fiber and an electrical conductor in order to provide a conductive pathway to a downhole tool. The anchoring assembly has a head and tail each having a throughbore with anchor receiving portions. An anchor with a deformable portion maybe inserted into the anchor receiving portions and the head and tail drawn together about the anchor. The anchor receiving portions have a narrowing diameter, which, upon abutment with the anchor causes the deformable portion of the anchor to deflect inward and secure a cable inserted therein. A conductive body is provided in the head or tail for coupling with the cable and providing a conductive pathway to a downhole tool.

22 Claims, 6 Drawing Sheets

(51) Int. Cl.
 *H01B 9/00* (2006.01)
 *H01B 11/22* (2006.01)

(56) References Cited

U.S. PATENT DOCUMENTS

| | | |
|---|---|---|
| 2010/0206582 A1 | 8/2010 | Meyyappan et al. |
| 2012/0126993 A1 | 5/2012 | Samson et al. |
| 2012/0153608 A1 | 6/2012 | Gill et al. |
| 2013/0168088 A1* | 7/2013 | Atkinson .............. E21B 49/081 |
| | | 73/152.28 |
| 2014/0037253 A1 | 2/2014 | Elenbaas et al. |
| 2014/0273599 A1* | 9/2014 | O'Sullivan ............ H01R 13/62 |
| | | 439/370 |

* cited by examiner

METHOD AND SYSTEM FOR ANCHORING DOWNHOLE COMMUNICATIONS PATHS

CROSS-REFERENCE TO RELATED APPLICATIONS

This application is a national stage entry of PCT/US2018/026113 filed Apr. 4, 2018, said application is expressly incorporated herein in its entirety.

FIELD

The present disclosure relates generally to communication and power cables for downhole tools. In particular, the present disclosure relates to anchoring communication and power cables for connection to downhole tools.

BACKGROUND

Wellbores are drilled into the earth for a variety of purposes including tapping into hydrocarbon bearing formations to extract the hydrocarbons for use as fuel, lubricants, chemical production, and other purposes. During various phases of hydrocarbon extraction, such as drilling, completion, and production, downhole tools are often employed to carry out tasks within the wellbore. These tasks may include, for instance, logging, measuring, or otherwise collecting data regarding the surrounding formation, downhole fluids or conditions. Such tools can require communication with the surface as well as electrical power supplied from the surface.

To facilitate communication with the surface, fiber optic cables may be employed because of their ability to transmit large amounts of information quickly. Due to harsh conditions downhole, fiber optic cables often have outer layers made up of steel or other rugged material to protect the inner optical fibers. With respect to electrical power, conventional copper or other conductive material is still necessary for providing electrical power to tools downhole. Hybrid cables have also been employed which have both optical fibers as well as electrical conductors, thereby facilitating fiber optic communication and electrical power in a single cable.

BRIEF DESCRIPTION OF THE DRAWINGS

Implementations of the present technology will now be described, by way of example only, with reference to the attached figures, wherein.

DETAILED DESCRIPTION

Figure 1:
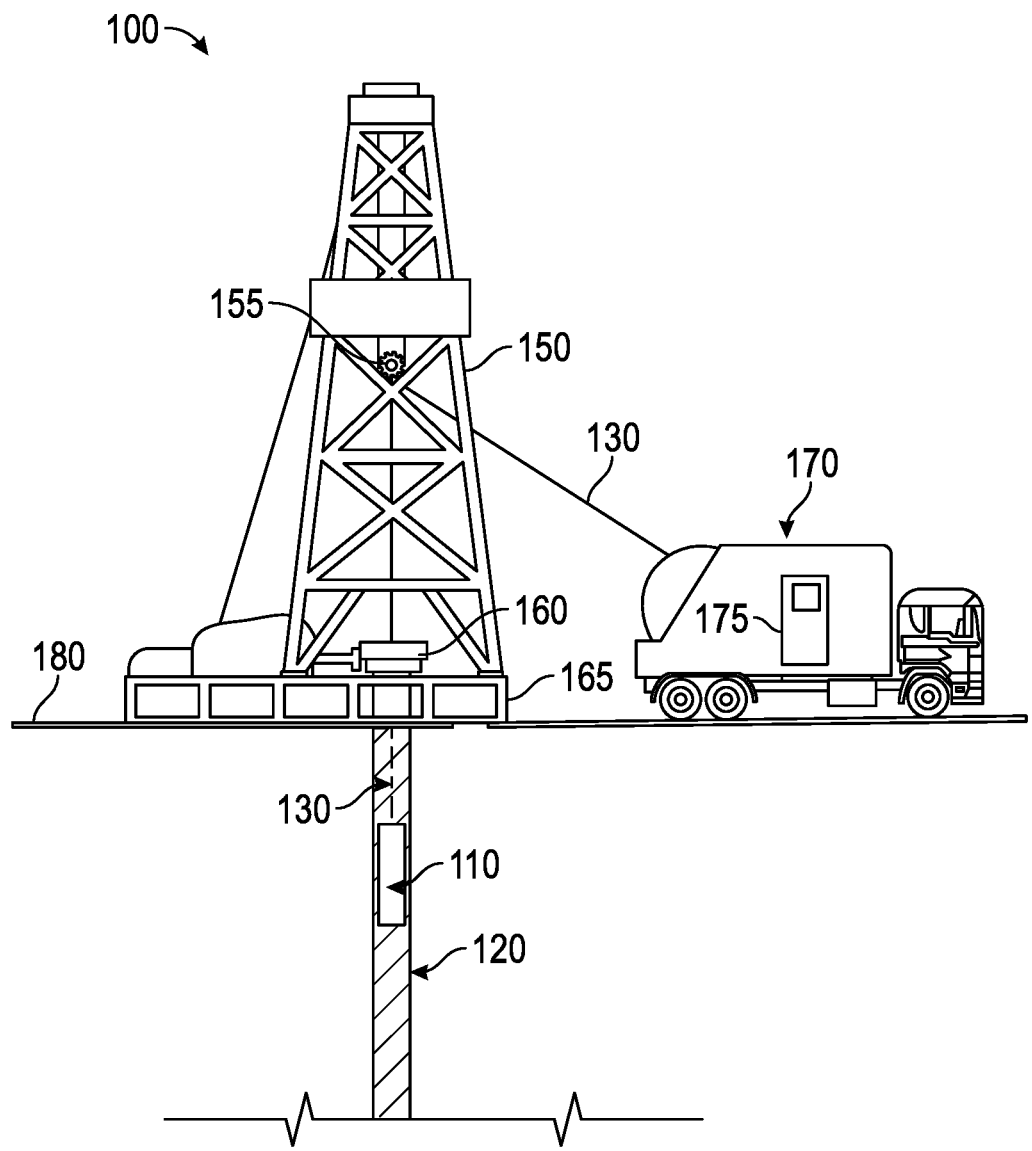
FIG. 1 is a schematic diagram of an exemplary wellbore environment in which the anchoring assembly can be employed.

It will be appreciated that for simplicity and clarity of illustration, where appropriate, reference numerals have been repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Disclosed herein is an assembly, method, and system for anchoring a fiber optic cable with a downhole tool. The fiber optic cable may be a hybrid type cable having both optical fibers and an electrical conductor. Such fiber optic cable may be an assembly of components, and may have an internal core with one or more optical fibers. The internal core may be contained within an inner metal tube which surrounds the internal core. An electrical conductor, such as conductive tape, may be provided as a layer wrapped around the inner metal tube. Further, around the electrical conductor may be an insulation layer to space the electrical conductor from an outer metal tube. The outer metal tube may be made of a strong metal such as steel so as to act as a protective outer layer for the entire cable assembly.

The inner metal tube and the electrical conductor may move independently of the outer metal tube, especially in cases where the outer metal tube is anchored or otherwise secured. The anchoring assembly disclosed herein is capable of a securing the electrical conductor and inner tube without crimping the outer metal tube or causing thinning of the insulation layer. Such thinning of the insulation layer, which may be caused by crimping the outer metal layer, may potentially short the electrical conductor as the outer metal tube nears or touches the electrical conductor. The anchor assembly as described herein can be used for both downhole and surface level connections. For example, the anchoring assembly can be provided within a reel (such as coiled tubing) at surface level, as well as inside the downhole tool itself.

FIG. 1 is a schematic diagram illustrating an exemplary wellbore operating environment 100 in which the anchor disclosed herein may be deployed. The environment 100 can include a downhole tool 110, and which may be any type of tool which requires power and/or communication with the surface or another downhole tool. The downhole tool 110 may be a logging tool or a measuring tool, and may include detection devices, receivers, emitters, or other instruments for measuring the formation, wellbore or downhole conditions such as pressure or temperature or other properties. Other downhole tools may include telemetry tools, perforation tools, retrieval or actuation tools, or any other type of wireline tool or other tool which may require both fiber and electrical power.

The wellbore operating environment 100 can include a drilling platform 165 equipped with a derrick 150 that supports a hoist 155. The downhole tool 110 can be lowered through rotary table 160 into the wellbore 120. Typically, the downhole tool 110 is lowered into the wellbore 120 and subsequently used to perform operations throughout the desired downhole area. The downhole tool 110 can be conveyed in the wellbore 120 by any conveyance 130 including, but not limited to, wireline, logging cable, slickline, tubing, coiled tubing, pipe, metallic wire, non-metallic wire, or composite wire. The conveyance 130 can also include a fiber optic cable, which may be the hybrid cable 200 illustrated in FIG. 2, having optical fibers and an electrical conductor which may be used to facilitate communications and electrical power between the downhole tool 110 and a surface control or processing facility 170. Accordingly, the downhole tool 110 may be communicatively coupled with the surface control or processing facility 170 at the surface 180 via the fiber optic cable disclosed herein, which may be a part of the conveyance 130.

The downhole tool 110 may include an anchoring assembly as disclosed herein (illustrated in FIGS. 3-6) to anchor a fiber optic cable to the downhole tool 110 so as to provide communications between the surface control or processing facility 170 and the downhole tool 110. While the control or processing facility 170 is depicted in FIG. 1 as a truck, the surface control or processing facility 170 may be any structure without departing from the spirit and scope of the present disclosure. In at least some instances, the downhole tool 110 may also receive power from the surface control or processing facility 170 via the fiber optic cable disclosed herein.

The surface control or processing facility 170 can include at least one computer system 175 communicatively coupled with the downhole tool 110. The computer system 175 may be capable of sending and receiving control signals to and from the downhole tool 110. The computer system 175 may be further capable of obtaining the measured responses from the downhole tool 110. In at least one example, the control or processing facility 170 and/or the computer system 175 may be located at the surface 180 adjacent to the wellbore 120, as depicted in FIG. 1. In an alternative or additional example, the surface control or processing facility 170 and/or the computer system 175 can be located at a separate location and the data can be transferred by either wired or wireless transmission.

Modifications, additions, or omissions may be made to FIG. 1 without departing from the spirit and scope of the present disclosure. For example, FIG. 1 depicts components of the wellbore operating environment 100 in a particular configuration. However, any suitable configuration of components may be used. Furthermore, fewer components or additional components beyond those illustrated may be included in the wellbore operating environment 100 without departing from the spirit and scope of the present disclosure. It should be noted that while FIG. 1 generally depicts a land-based operation, those skilled in the art would readily recognize that the principles described herein are equally applicable to operations that employ floating or sea-based platforms and rigs, without departing from the scope of the disclosure. If the anchoring assembly described herein is used in a wet environment the cable and tool should be disposed within an air chamber. Also, even though FIG. 1 depicts a vertical wellbore, the present disclosure is equally well-suited for use in wellbores having other orientations, including horizontal wellbores, slanted wellbores, multilateral wellbores or the like.

Figure 2:
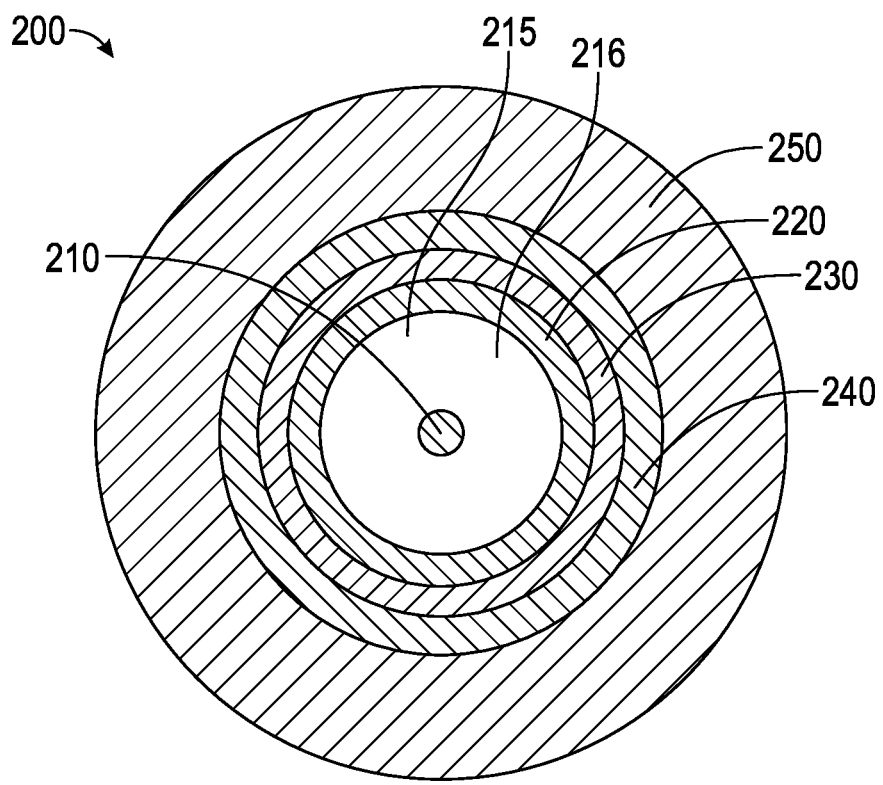
FIG. 2 is a cross-sectional view of an exemplary hybrid cable that can be used in combination with the anchoring assembly disclosed here.

FIG. 2 is a cross-sectional view of an exemplary fiber optic cable 200 in a plane perpendicular to a central axis. The fiber optic cable 200 is of a type that may be more specifically referred to as a hybrid cable 200 given the separate optical and electrically conductive pathways that are used for separate optical and electrical signal communication as further described below. The hybrid cable 200 can include at least one optical fiber 210. The optical fiber 210 may have a polymer coating such as an acrylate based polymer. The optical fiber 210 may be bend insensitive, and may be single mode or multi-mode. Multi-mode optical fibers permit the optical fibers to carry out more than one function, such as carrying out two or more of communication, temperature or pressure sensing whereas single mode may be limited to one of such functions. Although FIG. 2 illustrates hybrid cable 200 having a single optical fiber 210, the hybrid cable 200 may alternatively have a plurality of optical fibers, such as two to ten, or alternatively two to five optical fibers. The use of a plurality of optical fibers may permit separate control or redundancy. For instance, some optical fibers may be used for communicating control to the downhole tool 110 whereas others are used for communicating or taking measurements of pressure or temperature. Further, by use a plurality of optical fibers, if one or more optical fibers become damaged or inoperable, the remaining optical fibers may still be used.

The optical fiber 210 is disposed within an inner core 215. An inner tube 220 is positioned around the inner core 215 so as to surround and contain the contents of the inner core 215. The inner tube 220 may be a metal tube, such as steel, in which case together with the optical fiber 210 it may be referred to in the field as fiber in metal tube (FIMT). The inner core 215 can be filled with a viscous substance 216 to provide protection for the optical fiber 210. The viscous substance 216 may be liquids, gels, foams, or any other material capable of limiting quick or sudden movement within the tube which may damage the optical fibers. The optical fiber 210 provides optical communication between a downhole tool and surface equipment. For instance, the optical fiber 210 can be used to transmit information gathered downhole to the surface equipment. Additionally, the optical fiber 210 can be used to transmit commands from surface equipment to a tool downhole. An electrical conductor 230 can be positioned circumferentially around the inner tube 220, such that the entire external surface of the inner tube 220 is covered and surrounded by the electrical conductor 230. The electrical conductor 230 may be positioned such that no portion of the electrical conductor 230 overlaps itself as it wraps around the inner tube 220. The electrical conductor 230 provides a pathway for electrical communication between the downhole tool and the surface equipment. The electrical conductor 230 can be any conductive material suitable for transferring electrical signals and capable of withstanding temperatures downhole, including conductive metals such as copper. The electrical conductor 230 may be a thin conductive layer which may be wrapped about the inner tube, and may be a conductive tape, including copper tape. For example, the copper tape can provide power from the surface to the downhole tool. Accordingly, the electrical conductor may be provided along the entire length of the inner tube 220. The inclusion of both an optical fiber 210 and an electrical conductor 230 as separate signal pathways are aspects of this hybrid type of cable.

The electrical conductor 230 can be enclosed by an insulation material 240. Positioned around the insulation material 240 is an outer tube 250. The insulation material 240 can be any suitable temperature resistant material capable of withstanding temperatures downhole and may be corrosion resistant. In at least one example, the insulation material 240 can be a polymer such as fluorinated ethylene propylene (FEP) and formed in the shape of tubing. The insulation material 240 can provide protection and spacing between the outer tube 250 and the electrical conductor 230 to prevent contact which may cause a short. The outer tube 250 can be any suitable metal or metal alloy which is capable of grounding electricity and serves as a protective outer layer for the entire cable assembly. A particular metal alloy may include iron or steel, and may be nickel-iron-chromium alloy such as Alloy 825 (UNS designation N08825).

The design of the hybrid cable 200 allows for the inner tube 220 and the electrical conductor 230 to be independent from the outer tube 250. Due to the design, the outer tube 250 can be secured within the anchoring assembly 300 described herein, without restricting the movement of the inner tube 220 and electrical conductor 230.

The methods described herein are compatible with an anchoring assembly comprising both nonconductive and conductive materials. Such conductive materials can include, but are not limited to, metals, non-metallic conductors, conductive polymers, and any other suitable conductive material capable of withstanding downhole temperatures. Such non-conductive materials can include, but are not limited to, plastics, rubbers, ceramics, and any other non-conductive material capable of withstanding downhole temperatures. The combination of both conductive and nonconductive materials can aid in the prevention of traveling due to thermal expansion, as well as during coiling and uncoiling of the coiled tubing. Additionally, the presence of both conductive and non-conductive materials can prevent shorts in the electrical pathway. A conductive material can be included in the anchoring assembly to couple the electrical conductor 230 of the hybrid cable 200. Such connection can allow for the transfer of power from a power source to the cable or from the cable to a downhole tool.

Figure 3A:
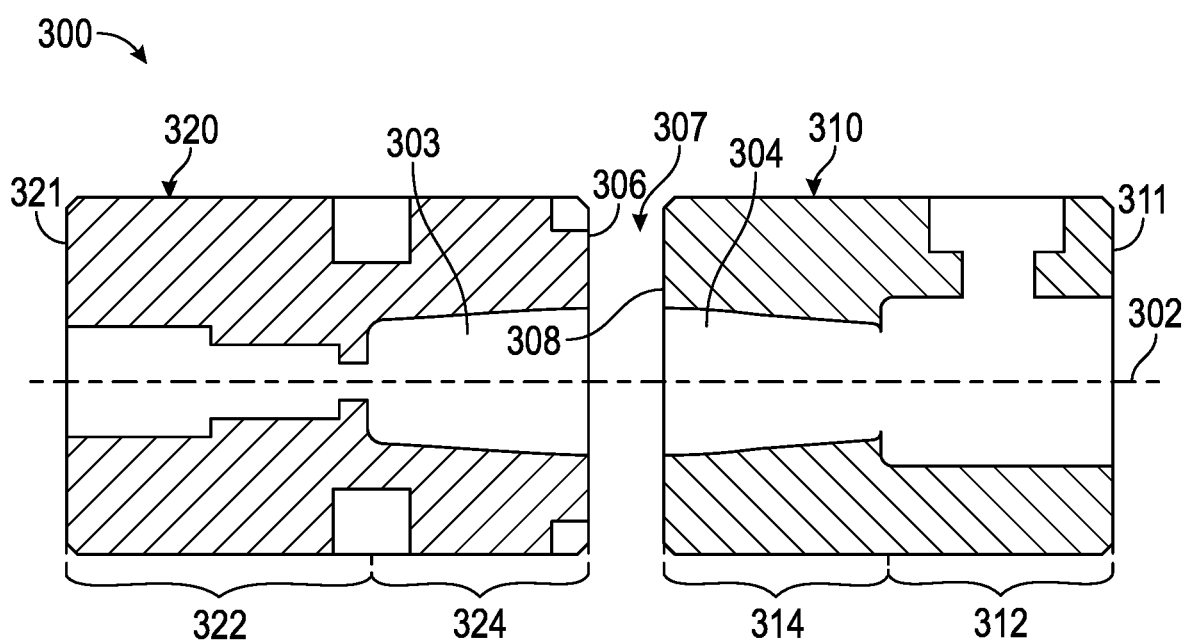
FIG. 3A is a cross-sectional view of an exemplary anchoring assembly useful for anchoring the hybrid cable of FIG. 2 with a downhole tool.

FIG. 3A is a cross-sectional view of an exemplary anchoring assembly 300 (as taken through a plane parallel with a central axis 302) for securing to a fiber optic cable such as the hybrid cable 200 of FIG. 2. The anchoring assembly 300 includes two nonconductive bodies that may be coupled together about a portion of the cable to anchor the inner tube 220 and electrical conductor (e.g. copper tape) 230 discussed in prior figures. The two nonconductive bodies include a first body (head) 310 and a second body (tail) 320. The anchoring assembly 300 may have any orientation, but in at least some instances, the tail 320 may be uphole with respect to the head 310 and correspondingly, the head 310 may be downhole with respect to the tail 320. Due to its downhole position, and described further below, the head 310 may couple with an electrical terminal of a downhole tool 110. The head 310 and tail 320 may be spaced from one another at middle portion 307 during and after assembly (illustrated below in FIG. 3C) or may contact one another.

The tail 320 may have a throughbore 303 extending from a proximal end 306 near middle portion 307 to a distal end 321. The throughbore 303 includes an entrance portion 322 which may be substantially cylindrical in shape and receive a hybrid cable 200 therein. The throughbore 303 includes a tail anchor receiving portion 324. The tail anchor receiving portion 324 narrows in diameter as it extends a distance from the proximal end 306 toward the distal end 321. The tail anchor receiving portion 324 may have a substantially frustoconical shape and may extend about half the distance of the tail 320, or alternatively may vary between about one-tenth ($1/10$) to about nine-tenths ($9/10$), or alternatively from about one-third ($1/3$) to about two-thirds ($2/3$) of the distance of the tail 320 as it extends toward the distal end 321.

Similarly, the head 310 includes a throughbore 304 extending laterally from a proximal end 308 to a distal end 311. The throughbore 304 includes an exit portion 312 and additionally a head anchor receiving portion 314. The exit portion 312 is shaped to receive a conductive body 340 (the conductive body is illustrated in FIG. 3C). The head anchor receiving portion 314 narrows in diameter as it extends a distance from the proximal end 308 toward the distal end 311. The head anchor receiving portion 314 may have a substantially frustoconical shape and may extend about half the distance of the head 310, or alternatively may vary between about one-tenth ($1/10$) to about nine-tenths ($9/10$), or alternatively from about one-third ($1/3$) to about two-thirds ($2/3$) of the distance of the head 310 as it extends toward the distal end 311.

The head 310 and the tail 320 may be arranged such that the proximal end 306 faces the proximal end 308. In such arrangement, the throughbore 304 of the head 310 and throughbore 303 of the tail 320 may be aligned to have a common axis 302. In this manner, the head anchor receiving portion 314 and tail anchor receiving portion 324 may be arranged about an inner anchor 330 (described below with respect to FIGS. 3B and 3C) to receive it therein.

As noted, both the head anchor receiving portion 314 and the tail anchor receiving portion 324 may have a frustoconical shape, which may include a wide base at the respective proximal ends 306,308, and narrows to a truncated tip extending toward the respective distal ends 311,321 of each of the head 310 and tail 320. Other polygonal shapes other than conical or frustoconical may be employed, however, the diameter of the head anchor receiving portion 314 and the tail anchor receiving portion 324 may be widest at the ends 306, 308 and then narrow extending toward each of the distal ends 311, 321.

The head 310 and tail 320 may be non-conductive and/or include a non-conductive coating along the respective throughbores 303,304. Accordingly, the head 310 and tail 320 may be made up of a non-conductive material which can include, but is not limited to, ceramics, thermoplastic materials (such as poly (ether ether ketone) (PEEK), or cross-linked PEEK), or any other suitable non-conductive material as described above.

Figure 3B:
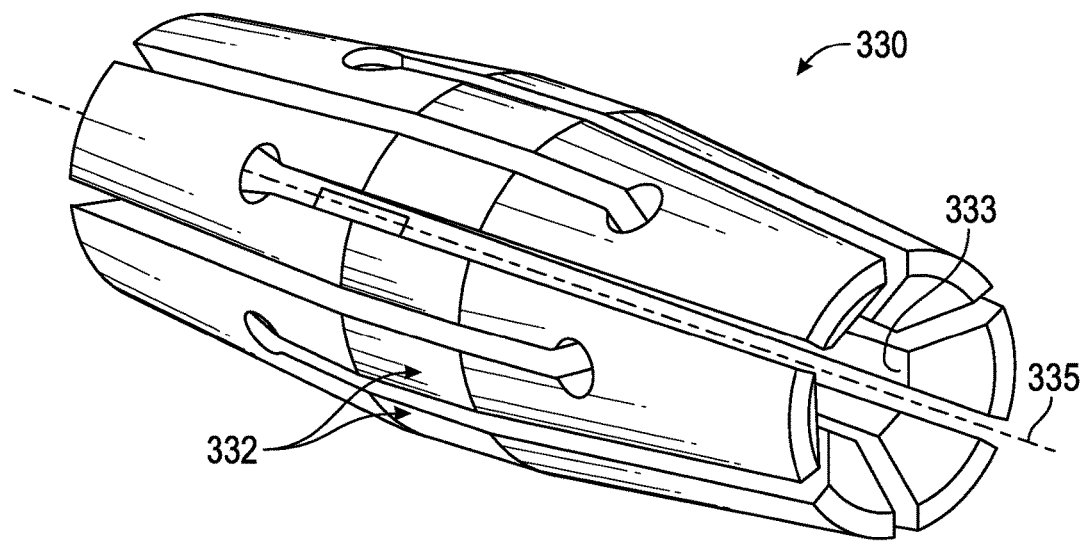
FIG. 3B is a schematic diagram of an exemplary anchor for insertion into the anchoring assembly disclosed herein.
Figure 3C:
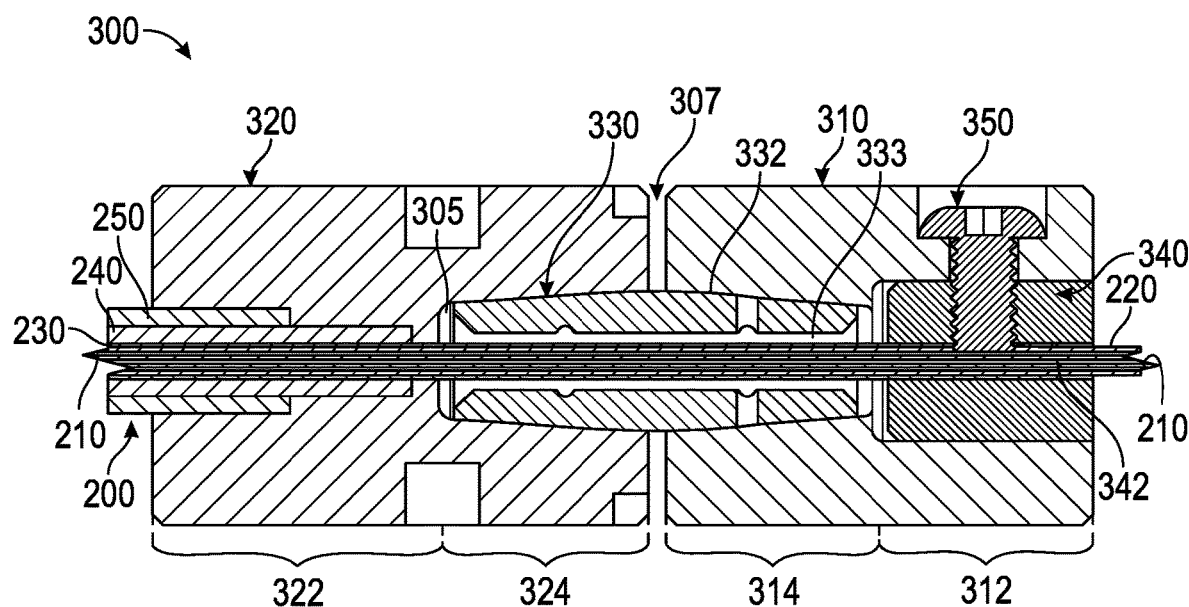
FIG. 3C is a schematic cross-sectional view of the anchoring assembly having a hybrid cable inserted therein.

FIG. 3B is a schematic diagram of an inner anchor 330 which may be inserted in the head and tail anchor receiving portions 314,324 (shown in FIG. 3A). The inner anchor 330 is illustrated as a collet and includes a deformable portion, namely collet fingers 332. A central throughbore 333 extends longitudinally throughout the length of the inner anchor 330 and has a central axis 335. The central throughbore 333 is shaped to receive a cable received therein, such as hybrid cable 200. The deformable collet fingers 332 deflect, or deform, radially inward toward the central axis 335 when subjected to a predetermined force. In particular (and as is explained further below with respect to FIG. 3C) due to anchor's abutment against the narrowing diameter of the head and tail anchor receiving portions 314,324, the collet fingers 332 of inner anchor 330 are deflected radially inward toward the central axis 335 as it is received in the head and tail anchor receiving portions 314,324. The deflection of the collet fingers 332 narrows the central throughbore 333. As the inner anchor 330 is deformed, the collet fingers 332 flex inward and tighten around any cable received therein, such as hybrid cable 200, securing it therein. Although the inner anchor 330 is shown as a collet, other anchoring devices may be employed which may have members or portions deflectable radially inwardly upon a predetermined force.

FIG. 3C is a schematic cross-sectional view of the anchoring assembly 300 having the inner anchor 330 received therein, along with a hybrid cable 200 inserted into the anchoring assembly 300. The inner anchor 330 may be inserted and received within the head and tail anchor receiving portions 314,324 of the anchor anchoring assembly 300. This may be carried out by arranging the head 310 and tail 320 about the inner anchor 330 such that the proximal end 306 faces the proximal end 308 and then moving the head 310 and tail 320 toward one another thereby reducing the distance between them. As the head 310 and tail 320 are urged toward one another about the inner anchor 330, the inner anchor 330 abuts the narrowing diameter of the head and tail anchor receiving portions 314,324. The narrowing diameter of the head and tail anchor receiving portions 314,324 deform the inner anchor 330 inward toward the central axis 335 (shown in FIG. 3B). Accordingly, the portion of the inner anchor 330 having collet fingers 332 can be sized slightly larger than a portion of the internal diameter of the head and tail anchor receiving portions 314,324 so that abutment and deformation will occur. The hybrid cable 200 may be inserted through the anchoring assembly 300 and inner anchor 330. As the inner anchor 330 is deformed inwardly, the inner anchor 330 deforms against the hybrid cable 200 securing and anchoring it in place, which may be referred to herein as the anchored configuration.

The inner anchor 330 can be made of any suitable deformable material, such as metal, capable of deformation under a predetermined pressure. Correspondingly, the head and tail 310,320 are made up of sufficiently strong material to deform the inner anchor 330 when the inner anchor 330 is inserted into the head and tail anchor receiving portions 314,324.

Referring still to FIG. 3C, a conductive body 340 may be inserted into the exit portion 312 of the head 310 which is correspondingly shaped to receive it. The conductive body 340 can be any electrically conductive material suitable for transmitting electricity, for instance copper. The conductive body 340 includes a conductive throughbore 342 for receiving a fiber optic cable transmitting electricity from the fiber optic cable 200 when inserted therein. An anchoring fastener 350, such as a threaded screw or bolt, can be used to tighten the conductive body 340 such that it secures the hybrid cable 200 within the anchoring assembly 300. Although shown as inserted in the distal end 311, the conductive body 340 may equally be inserted in the entrance portion 322 which may be shaped to receive it.

As illustrated in FIG. 3C, the hybrid cable 200 may be secured in the anchoring assembly 300. The hybrid cable 200 may be inserted through the throughbore 303, the throughbore 304, the central throughbore 333, and the conductive throughbore 342. As the hybrid cable 200 enters the anchoring assembly 300, and in particular the tail 320, the outer tube 250 may terminate prior to reaching the inner anchor 330 or the head and tail receiving portions 314,324 of the throughbore 305. The insulation material 240 may extend a distance beyond the outer tube 250 in the anchoring assembly 300 and may extend to the inner anchor 330 but not enter the inner anchor 330. Additionally, the insulation material may 240 may terminate prior to reaching the inner anchor 330. The electrical conductor 230 is accordingly exposed and secured by the inner anchor 330. The electrical conductor 230 passes through the inner anchor 330 and into the conductive body 340. The electrical conductor 230 contacts the conductive body 340 forming an electrical pathway such that electrical power can be transmitted between the electrical conductor 230 and conductive body 340.

Figure 4:
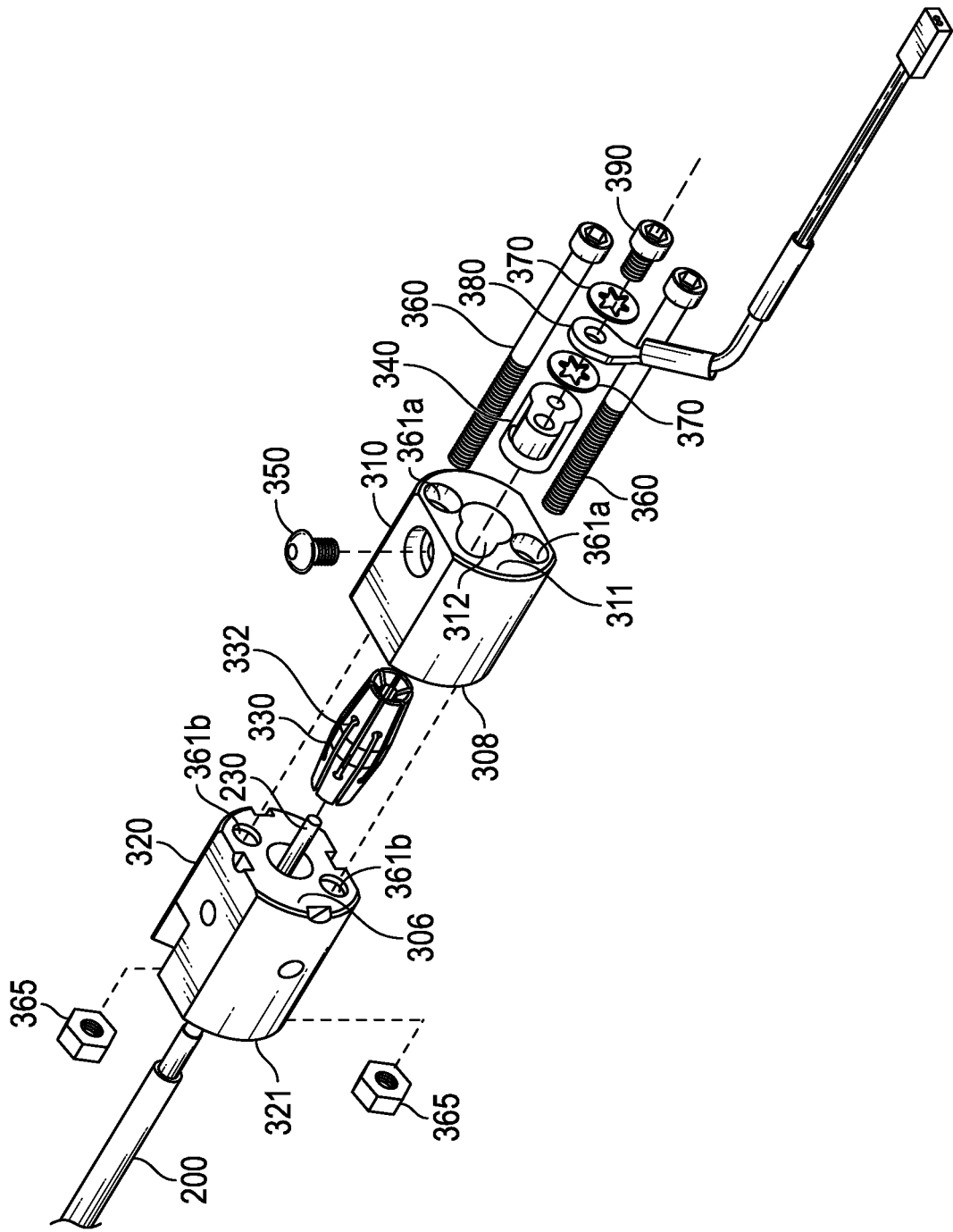
FIG. 4 is a schematic diagram of an exploded view of the anchoring assembly.

FIG. 4 is a schematic diagram of an exploded view of the anchoring assembly 300 which can be used to transmit power to the hybrid cable 200 and send power to a downhole tool, such as downhole tool 110 (shown in FIG. 1). As illustrated, the inner anchor 330 can fit between the head 310 and the tail 320 of the anchoring assembly 300. The anchoring assembly 300 can also include one or more longitudinally extending holes 361a in head 310 which are aligned with holes 361b in tail 320. The longitudinally extending holes 361a, 361b are sized to fit one or more end fasteners 360, which may be threaded bolts. The end fasteners 360 can extend through the aligned holes 361a, 361b from the head 310 through the tail 320. A tightening nut 365 may be provided on the end of the end fasteners 360 to assist tightening, and may have a threaded hole for placement around the end fasteners 360. As the head 310 and the tail 320 are secured together by the tightening of the end fasteners 360, the surfaces of the head and tail anchor receiving portions 314,324 abut against the inner anchor 330 deforming it against the hybrid cable 200.

An electrical connection is provided at the distal end 311 of the head 310 by coupling of the conductive body 340 with an electrical terminal 380. The electrical terminal may be communicatively coupled with a downhole tool, such as downhole tool 110 (shown in FIG. 1). The conductive body 340 can be coupled with an electrical terminal 380 having one or more washers 370 to keep the connection in place, which may be lock washers. A connection fastener 390 (such as a screw or bolt) can be employed to secure the electrical terminal 380 to the head 310 of the anchor assembly 330.

Figure 5:
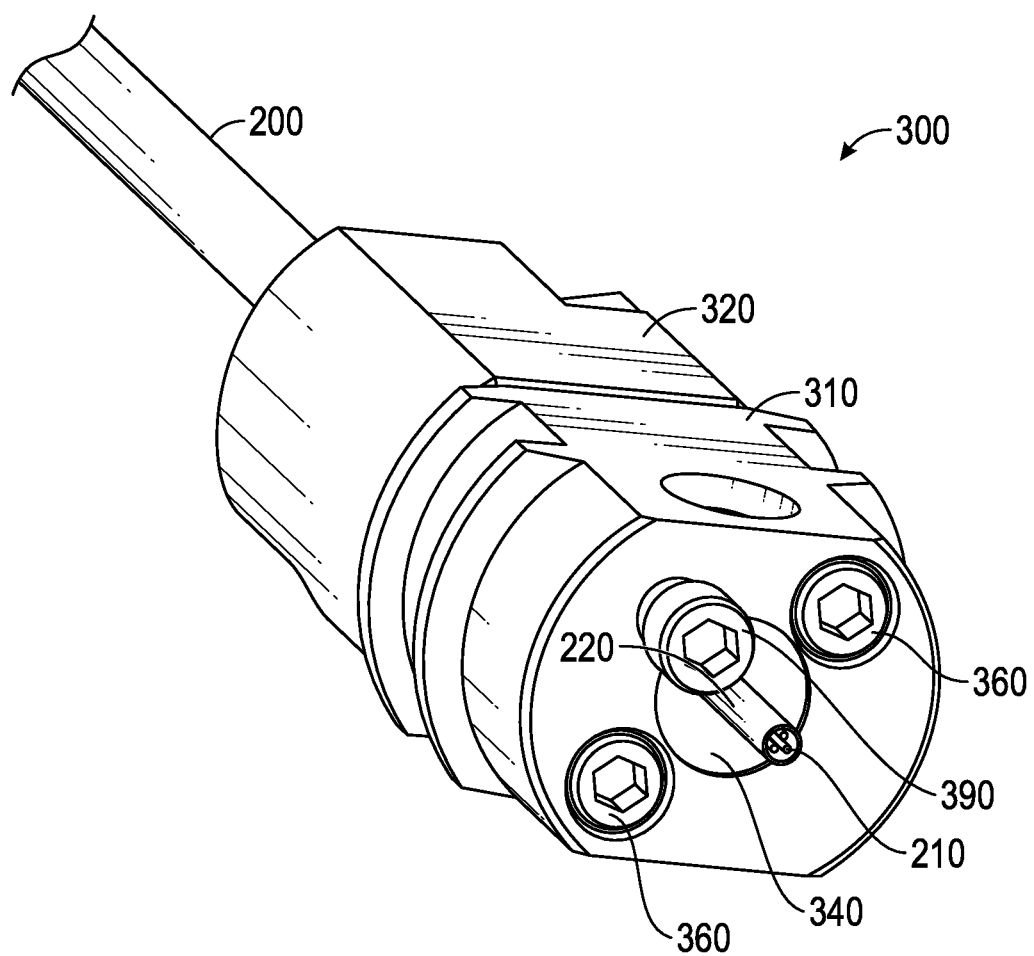
FIG. 5 is a schematic diagram of the anchoring assembly of FIG. 4 having a hybrid cable inserted therein.

FIG. 5 is a schematic diagram of the anchoring assembly 300 having hybrid cable 200 inserted therein. End fasteners 360 can extend through the head 310 and the tail 320 of the anchoring assembly 300, securing the head 310 and the tail 320 together and collapsing the inner anchor 330, securing the hybrid cable 200 in place. A connection fastener 390 is used to secure the conductive body 340 to the electrical terminal 380 (FIG. 4) of the hybrid cable 200.

Figure 6:
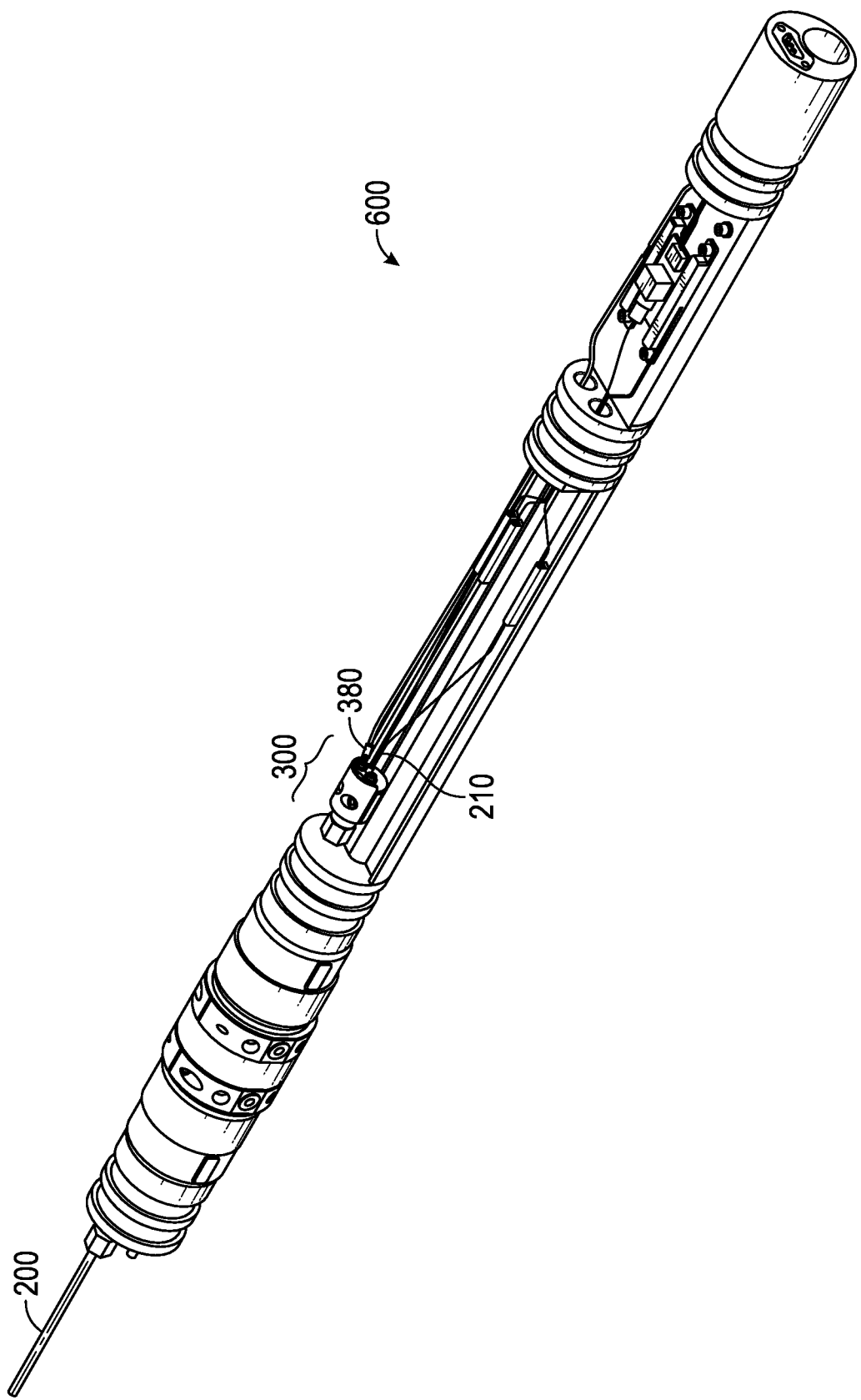
FIG. 6 is a schematic diagram of the anchoring assembly of FIG. 4 disposed within a downhole tool.

As described above, the anchoring assembly 300 can be disposed within a tool. FIG. 6 is a schematic diagram of anchoring assembly 300 disposed within a downhole tool 600. As illustrated, electrical terminal 380 is coupled with the anchoring assembly to provide power to the downhole tool 600. Additionally, optical fibers 210 may exit the anchoring assembly 300 and connect with the downhole tool 600 for optical communication. Downhole tools compatible with the anchoring assembly 300 as described herein can include, but are not limited to, a logging tool, a telemetry tool, perforation tool, or any other type of wireline tool which requires one or both fiber and electrical power. Such tools can be rated for extreme temperatures of up to around 350 degrees Fahrenheit. Accordingly, the hybrid cable 200 can extend through the downhole tool 600 to provide both optical and electrical connection between the downhole tool 600 and surface equipment.

Even though not shown in the figures, the anchoring assembly can also be installed at the surface level as well. In at least one example, the anchoring assembly can be contained in a reel at the surface, such as within coiled tubing. In yet another example, the anchoring assembly can be both located at the surface as well as disposed within the tool.

Numerous examples are provided herein to enhance understanding of the present disclosure. A specific set of statements are provided as follows.

Statement 1: An anchoring assembly including: a head and a tail each having a throughbore extending from a proximal end to a distal end, the throughbore of each of the head and the tail having an anchor receiving portion narrowing in diameter as it extends from the proximal end toward the distal end of each of the respective head and tail; an inner anchor having a deformable portion and a central throughbore with a central axis; and a conductive body coupleable with the head or the tail, the conductive body having a conductive throughbore, the inner anchor receivable in the anchor receiving portions of the head and the tail, with the proximal ends of the head and the tail facing one another, the deformable portion of the inner anchor deflectable toward the central axis upon abutment with the narrowing diameter of the anchor receiving portion of the head or the tail.

Statement 2: The anchoring assembly according to Statement 1, wherein the head and the tail are non-conductive.

Statement 3: The anchoring assembly according to Statements 1 or 2, further comprising an electrical terminal coupleable with the conductive body.

Statement 4: The anchoring assembly according to any one of the preceding Statements 1-3, further comprising a cable having an optical fiber, the cable insertable into the throughbore of each of the head and the tail, the central throughbore and the conductive throughbore.

Statement 5: The anchoring assembly according to any one of the preceding Statements 1-4, wherein the cable comprises: a core containing the optical fiber, an inner metal tube positioned around the core, an electrical conductor positioned around the inner metal tube, an outer tube positioned around the electrical conductor, and wherein the electrical conductor couples with the conductive body forming an electrical pathway when inserted within the anchoring assembly.

Statement 6: The anchoring assembly according to any one of the preceding Statements 1-5, wherein the anchor receiving portion of each of the head and the tail has a frustoconical shape.

Statement 7: A method including: inserting a cable into an anchoring assembly, the anchoring assembly comprising: a head and a tail each having a throughbore extending from a proximal end to a distal end, the throughbore of each of the head and the tail having an anchor receiving portion narrowing in diameter as it extends from the proximal end toward the distal end of each of the respective head and tail, an inner anchor having a deformable portion and a central throughbore with a central axis, and a conductive body coupleable with the head or the tail, the conductive body having a conductive throughbore; and receiving the inner anchor in the anchor receiving portions of the head and the tail, the proximal end of the head facing the proximal end of the tail, the deformable portion of the inner anchor deflecting toward the central axis upon abutment with the narrowing diameter of the anchor receiving portions of the head or the tail, thereby anchoring the cable within the anchoring assembly and the cable coupling with the conductive body forming an electrical pathway.

Statement 8: The method according to Statement 7, wherein the cable has an optical fiber.

Statement 9: The method according to Statement 7 or 8, wherein the cable is a hybrid cable having an optical fiber and an electrical conductor.

Statement 10: The method according to any one of the preceding Statements 7-9, wherein the cable comprises: a core containing the optical fiber, an inner metal tube positioned around the core, the electrical conductor wrapped around the inner metal tube, an outer tube positioned around the electrical conductor, and wherein the electrical conductor couples with the conductive body forming an electrical pathway when inserted within the anchoring assembly.

Statement 11: The method according to any one of the preceding Statements 7-10, further comprising coupling an electrical terminal with the conductive body.

Statement 12: The method according to any one of the preceding Statements 7-11, wherein the electrical terminal is coupled with a downhole tool.

Statement 13: The method according to any one of the preceding Statements 7-12, wherein the head and the tail are non-conductive.

Statement 14: The method according to any one of the preceding Statements 7-13, wherein the anchor receiving portion of each of the head and the tail has a frustoconical shape.

Statement 15: A system including: an anchoring assembly with a cable having an optical fiber received therein, the anchoring assembly including: a head and a tail each having a throughbore extending from a proximal end to a distal end, the throughbore of each of the head and the tail having an anchor receiving portion narrowing in diameter as it extends from the proximal end toward the distal end of each of the respective head and tail, an inner anchor having a deformable portion and a central throughbore with a central axis, and a conductive body coupleable with the head or the tail, the conductive body having a conductive throughbore; and the inner anchor received in the anchor receiving portions of the head and the tail, the proximal end of the head facing the proximal end of the tail, the deformable portion of the inner anchor deflected toward the central axis upon abutment with the narrowing diameter of the anchor receiving portion of the head or the tail, thereby anchoring the cable within the anchoring assembly and the cable coupling with the conductive body forming an electrical pathway.

Statement 16: The system according to Statement 15, wherein the cable has an optical fiber.

Statement 17: The system according to Statement 15 or 16, wherein the cable is a hybrid cable having an optical fiber and an electrical conductor.

Statement 18: The system according to any one of the preceding Statements 15-17, wherein the cable comprises: a core containing the optical fiber, an inner metal tube positioned around the core, the electrical conductor wrapped around the inner metal tube, an outer tube positioned around the electrical conductor, wherein the electrical conductor couples with the conductive body to form an electrical pathway when inserted within the anchoring assembly.

Statement 19: The system according to any one of the preceding Statements 15-18, further comprising an electrical terminal coupled with the conductive body.

Statement 20: The system according to any one of the preceding Statements 15-19, further comprising a downhole tool coupled with the electrical terminal.

Statement 21: The system according to any one of the preceding Statements 15-20, wherein the head and the tail are non-conductive.

Statement 22: The system according to any one of the preceding Statements 15-21, wherein the anchor receiving portion of each of the head and the tail has a frustoconical shape.

The disclosures shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the examples described above may be modified within the scope of the appended claims.

What is claimed is:

1. An anchoring assembly comprising:
   a head and a tail each having a throughbore extending from a proximal end to a distal end, the throughbore of each of the head and the tail having an anchor receiving portion narrowing in diameter as it extends from the proximal end toward the distal end of each of the respective head and tail;
   an inner anchor having a deformable portion and a central throughbore with a central axis; and
   a conductive body coupleable with the head or the tail, the conductive body having a conductive throughbore,
   the inner anchor receivable in the anchor receiving portions of the head and the tail such that the head and the tail are urged toward one another about the inner anchor, with the proximal ends of the head and the tail facing one another, the deformable portion of the inner anchor deflectable toward the central axis upon abutment with the narrowing diameter of the anchor receiving portion of the head or the tail.

2. The anchoring assembly of claim 1, wherein the head and the tail are non-conductive.

3. The anchoring assembly of claim 1, further comprising an electrical terminal coupleable with the conductive body.

4. The anchoring assembly of claim 1, further comprising a cable having an optical fiber, the cable insertable into the throughbore of each of the head and the tail, the central throughbore and the conductive throughbore.

5. The anchoring assembly of claim 4, wherein the cable comprises:
   a core containing the optical fiber,
   an inner metal tube positioned around the core,
   an electrical conductor positioned around the inner metal tube,
   an outer tube positioned around the electrical conductor, and
   wherein the electrical conductor couples with the conductive body forming an electrical pathway when inserted within the anchoring assembly.

6. The anchoring assembly of claim 1, wherein the anchor receiving portion of each of the head and the tail has a frustoconical shape.

7. A method comprising:
   inserting a cable into an anchoring assembly, the anchoring assembly comprising:
      a head and a tail each having a throughbore extending from a proximal end to a distal end, the throughbore of each of the head and the tail having an anchor receiving portion narrowing in diameter as it extends from the proximal end toward the distal end of each of the respective head and tail,
      an inner anchor having a deformable portion and a central throughbore with a central axis, and
      a conductive body coupleable with the head or the tail, the conductive body having a conductive throughbore; and
   receiving the inner anchor in the anchor receiving portions of the head and the tail, the proximal end of the head facing the proximal end of the tail, the deformable portion of the inner anchor deflecting toward the central axis upon abutment with the narrowing diameter of the anchor receiving portions of the head or the tail, thereby anchoring the cable within the anchoring assembly and the cable coupling with the conductive body forming an electrical pathway.

8. The method of claim 7, wherein the cable has an optical fiber.

9. The method of claim 7, wherein the cable is a hybrid cable having an optical fiber and an electrical conductor.

10. The method of claim 9, wherein the cable comprises:
    a core containing the optical fiber,
    an inner metal tube positioned around the core, the electrical conductor wrapped around the inner metal tube,
    an outer tube positioned around the electrical conductor, and
    wherein the electrical conductor couples with the conductive body forming an electrical pathway when inserted within the anchoring assembly.

11. The method of claim 7, further comprising coupling an electrical terminal with the conductive body.

12. The method of claim 11, wherein the electrical terminal is coupled with a downhole tool.

13. The method of claim 7, wherein the head and the tail are non-conductive.

14. The method of claim 7, wherein the anchor receiving portion of each of the head and the tail has a frustoconical shape.

15. A system comprising:
    an anchoring assembly with a cable having an optical fiber received therein, the anchoring assembly comprising:
       a head and a tail each having a throughbore extending from a proximal end to a distal end, the throughbore of each of the head and the tail having an anchor receiving portion narrowing in diameter as it extends from the proximal end toward the distal end of each of the respective head and tail,
       an inner anchor having a deformable portion and a central throughbore with a central axis, and
       a conductive body coupleable with the head or the tail, the conductive body having a conductive throughbore; and
    the inner anchor received in the anchor receiving portions of the head and the tail, the proximal end of the head facing the proximal end of the tail, the deformable portion of the inner anchor deflected toward the central axis upon abutment with the narrowing diameter of the anchor receiving portion of the head or the tail, thereby anchoring the cable within the anchoring assembly and the cable coupling with the conductive body forming an electrical pathway.

16. The system of claim 15, wherein the cable has an optical fiber.

17. The system of claim 15, wherein the cable is a hybrid cable having an optical fiber and an electrical conductor.

18. The system of claim 17, wherein the cable comprises:
    a core containing the optical fiber, an inner metal tube positioned around the core, the electrical conductor wrapped around the inner metal tube, an outer tube positioned around the electrical conductor, wherein the electrical conductor couples with the conductive body to form an electrical pathway when inserted within the anchoring assembly.

19. The system of claim 15, further comprising an electrical terminal coupled with the conductive body.

20. The system of claim 19 further comprising a downhole tool coupled with the electrical terminal.

21. The system of claim 15, wherein the head and the tail are non-conductive.

22. The system of claim 15, wherein the anchor receiving portion of each of the head and the tail has a frustoconical shape.

* * * * *